(12) United States Patent
He et al.

(10) Patent No.: US 11,037,034 B2
(45) Date of Patent: Jun. 15, 2021

(54) SCALABLE DATA FUSION ARCHITECTURE AND RELATED PRODUCTS

(71) Applicant: HANGZHOU FABU TECHNOLOGY CO., LTD., Hangzhou (CN)

(72) Inventors: Xiaofei He, Hangzhou (CN); Yu Cao, Tempe, AZ (US); Hang Nguyen, Tempe, AZ (US)

(73) Assignee: HANGZHOU FABU TECHNOLOGY CO., LTD., Hangzhou (CN)

( * ) Notice: Subject to any disclaimer, the term of this patent is extended or adjusted under 35 U.S.C. 154(b) by 256 days.

(21) Appl. No.: 16/409,744

(22) Filed: May 10, 2019

(65) Prior Publication Data

US 2020/0302221 A1    Sep. 24, 2020

Related U.S. Application Data

(63) Continuation of application No. PCT/CN2019/079032, filed on Mar. 21, 2019.

(51) Int. Cl.
    *G06K 9/00* (2006.01)
    *G06K 9/62* (2006.01)
    *H04Q 9/02* (2006.01)

(52) U.S. Cl.
    CPC ........... *G06K 9/629* (2013.01); *H04Q 9/02* (2013.01)

(58) Field of Classification Search
    CPC .. G06K 9/629; G06K 9/4604; G06K 9/00791; G06K 9/6289; H04W 84/18; H04Q 9/02
    See application file for complete search history.

(56) References Cited

U.S. PATENT DOCUMENTS

| 2008/0010631 A1* | 1/2008 | Harvey | G06F 8/36 717/131 |
| 2013/0238535 A1* | 9/2013 | Leppanen | H04L 67/12 706/12 |

(Continued)

FOREIGN PATENT DOCUMENTS

| CN | 106529384 A | 3/2017 |
| CN | 108965377 A | 12/2018 |

(Continued)

OTHER PUBLICATIONS

The International Search Report of corresponding International application No. PCT/CN2019/079032, dated Mar. 25, 2019.

*Primary Examiner* — Ojiako K Nwugo
(74) *Attorney, Agent, or Firm* — J.C. Patents

(57) ABSTRACT

Provided are a scalable data fusion method and related products. The scalable data fusion method is applied in a central device and includes: receiving sensing data transmitted by each of M first edge devices, wherein M is an integer equal to or greater than 1; fusing the sensing data transmitted by each of the M first edge devices to obtain M pieces of fused data respectively corresponding to the M first edge devices; distributing the M pieces of fused data to the M first edge devices respectively; receiving object information transmitted by each of the M first edge devices, wherein the object information is obtained based on the fused data; and integrating the object information transmitted by each of the M first edge devices and construct surrounding information based on the integrated object information.

11 Claims, 7 Drawing Sheets

(56) References Cited

U.S. PATENT DOCUMENTS

| | | | |
|---|---|---|---|
| 2016/0142160 A1* | 5/2016 | Walker | H04W 4/38 |
| | | | 702/104 |
| 2017/0206464 A1 | 7/2017 | Clayton et al. | |
| 2018/0054490 A1* | 2/2018 | Wadhwa | G01S 5/0263 |
| 2018/0067966 A1* | 3/2018 | Oder | G01S 13/865 |
| 2019/0138825 A1* | 5/2019 | Lee | G06K 9/00825 |
| 2019/0197196 A1* | 6/2019 | Yang | G06T 17/05 |
| 2019/0258894 A1* | 8/2019 | Zeng | G06K 9/00798 |
| 2020/0012883 A1* | 1/2020 | Kuo | G06K 9/629 |

FOREIGN PATENT DOCUMENTS

| | | |
|---|---|---|
| CN | 109323700 A | 2/2019 |
| JP | 6448872 B1 | 1/2019 |

\* cited by examiner

SCALABLE DATA FUSION ARCHITECTURE AND RELATED PRODUCTS

CROSS-REFERENCE TO RELATED APPLICATIONS

This application is a continuation of International Application No. PCT/CN2019/079032, filed on Mar. 21, 2019 and entitled "A SCALABLE DATA FUSION ARCHITECTURE AND RELATED PRODUCTS", the disclosure of which is hereby incorporated by reference in its entirety.

TECHNICAL FIELD

The present disclosure relates to the technical field of data processing, and in particular, to a scalable data fusion architecture and related products.

BACKGROUND

A self-driving car, also known as a robot car, an autonomous car, or a driverless car, is a vehicle that is capable of sensing its environment and moving with little or no human input. Autonomous cars combine a variety of sensors to perceive their surroundings. Advanced control systems process information from the sensors to identify appropriate navigation paths, as well as obstacles and relevant signage.

Data fusion, which is commonly used in the control systems, is a process of integrating multiple sensors to produce more reliable, accurate, and useful information than that provided by any individual sensor. It is actually a combination of data from multiple sensors to extract and construct the three dimensions (3D) surrounding information.

Future autonomous driving requires more and higher definition (HD) sensors, such as HD cameras, >200 beams light detection and ranging (LiDAR) and four dimensions (4D) image mm wave radars, as well as more accurate perception from multi-modal sensor data and faster processing speed.

This background information is provided to reveal information believed by the applicant to be of possible relevance to the present disclosure. No admission is necessarily intended, nor should be construed, that any of the preceding information constitutes prior art against the present disclosure.

SUMMARY

In view of the above, in order to overcome the above problem, the present disclosure provides a scalable data fusion method and related products.

The foregoing and other objects are achieved by the subject matter of the independent claims. Further implementation forms are apparent from the dependent claims, the description and the figures.

A first aspect of the present disclosure relates to a scalable data fusion method applied in a central device and including:
receiving sensing data transmitted by each of M first edge devices, where M is an integer equal to or greater than 1;
fusing the sensing data transmitted by each of the M first edge devices to obtain M pieces of fused data respectively corresponding to the M first edge devices;
distributing the M pieces of fused data to the M first edge devices respectively;
receiving object information transmitted by each of the M first edge devices, where the object information is obtained based on the fused data; and
integrating the object information transmitted by each of the M first edge devices and constructing surrounding information based on the integrated object information.

A second aspect of the present disclosure relates to a scalable data fusion method applied in a first edge device and including:
transmitting sensing data to a central device;
receiving fused data distributed by the central device, where the fused data is obtained by the central device through fusion of the sensing data transmitted by each of M first edge devices, where M is an integer equal to or greater than 1;
extracting object information from the fused data; and
transmitting the object information to the central device.

A third aspect of the present disclosure provides a central device for performing the method according to any above possible implementation manner of the first aspect. Specifically, the central device includes functional modules for performing the method according to the first aspect.

A fourth aspect of the present disclosure provides a first edge device for performing the method according to any above possible implementation manner of the first aspect. Specifically, the first edge device includes functional modules for performing the method according to the second aspect.

A fifth aspect of the present disclosure provides a central device including a processor, a memory and a transceiver. Through an internal connection path, the processor, the memory and the transceiver communicate with each other and transmit control and/or data signals, such that the central device performs the method according to the first aspect.

A sixth aspect of the present disclosure provides a first edge device including a processor, a memory and a transceiver. Through an internal connection path, the processor, the memory and the transceiver communicate with each other and transmit control and/or data signals, such that the first edge device performs the method according to the second aspect.

A seventh aspect of the present disclosure the present disclosure relates to a chip, including a processor for calling and running a computer program from a memory, causing a device on which the chip is mounted to perform the scalable data fusion method according to the first aspect.

An eighth aspect of the present disclosure the present disclosure relates to a chip, including a processor for calling and running a computer program from a memory, causing a device on which the chip is mounted to perform the scalable data fusion method according to the second aspect.

A ninth aspect of the present disclosure the present disclosure relates to a computer readable storage medium storing a computer program, where the program is executed by a processor to perform the scalable data fusion method according to the first aspect.

A tenth aspect of the present disclosure the present disclosure relates to a computer readable storage medium storing a computer program, where the program is executed by a processor to perform the scalable data fusion method according to the second aspect.

An eleventh aspect of the present disclosure the present disclosure relates to a distributed system including a central device and at least one first edge device, the central device being connected to N edge devices and interacted with M first edge devices in the N edge devices, where N and M are integers equal to or greater than 1, and N is equal to or greater than M, where the central device is configured to perform the scalable data fusion method according to the first aspect and the first edge device is configured to perform the scalable data fusion method according to the second aspect.

With the method, the devices and the system provided in the present disclosure, data fusion is jointly managed by both the central device and the first edge devices, instead of the central device alone (as done in prior art), thereby reducing the complexity and cost/power of the data fusion. Besides, in order to handle the increasing amount of data, the number of the first edge devices may be increased instead of building a more powerful central device, thus achieving a more flexible system. Further, the workload will be re-distributed among other first edge devices if a first edge device has a functional failure, so as to guarantee system availability, thus increasing the system reliability.

BRIEF DESCRIPTION OF DRAWINGS

The accompanying drawings are used to provide a further understanding of the present disclosure, constitute a part of the specification, and are used to explain the present disclosure together with the following specific embodiments, but should not be construed as limiting the present disclosure.

DESCRIPTION OF EMBODIMENTS

Figure 1:
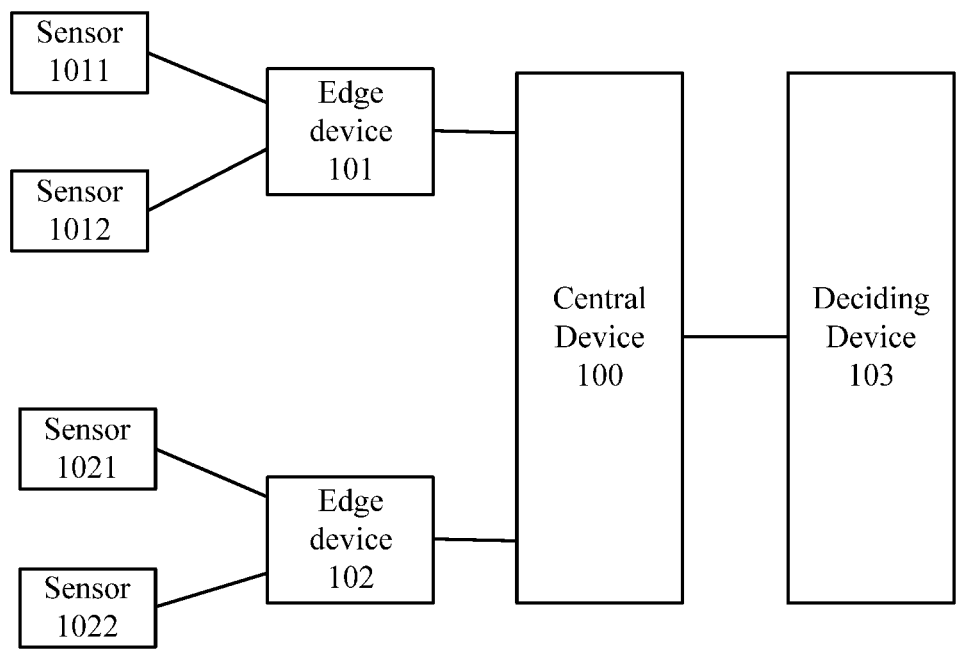
FIG. 1 is a systematic diagram of a distributed system in which a scalable data fusion method is applied according to an embodiment of the present disclosure.

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

As described in the background, for autonomous driving, it is vital to construct the 3D surrounding information for safety and other considerations. In related art, two kinds of methods are commonly used for data fusion. In a first method, also called as Fusion Second method, information of objects is extracted from each sensor first, and then fused together to obtain the surrounding information. In a second method, also called as Fusion First method, data from each sensor is fused together first to obtain the fused data, and then the fused data is extracted for object information to complete the construction of the surrounding information. Both of the methods have their advantages and disadvantages. Either of the Fusion First method and the Fusion Second method may be implemented on a System-on-a-Chip (SoC). The first method requires a lower bandwidth to transfer object information, and lower processing power needed to merge box-level information, however, it may provide a lower recognition accuracy since data from each sensor may not provide enough confidence for information extraction. In contrast, the second method may provide a higher accuracy from multiple types of sensor data at the cost of higher bandwidth for data transfer and more computing power needed to process the larger amount of data in real time. In general, self-driving is moving toward Fusion First method for higher perception accuracy.

On considering both of the cost and the computing accuracy, the present disclosure discloses a scalable data fusion method, a distributed system in which the scalable data fusion method applies and related products for performing the scalable data fusion method. The scalable data fusion method and the related products may be applied in many fields depending on actual needs, such as autonomous driving.

In order to describe the present disclosure more clearly, an exemplary system is shown in FIG. 1 in the first place. FIG. 1 is a systematic diagram of a distributed system in which a scalable data fusion method is applied according to an embodiment of the present disclosure. The distributed system may include a central device and N edge devices, where N is an integer equal to or greater than 1. Each edge device is connected to at least one sensor, for example, for the i-th edge device, it is connected to $X_i$ sensors, where $X_i$ is an integer greater than or equal to 1, and i=0, 1 . . . N. The numbers of sensors connected to different edge devices may be the same or different, that is, different edge devices may be connected to different number of sensors according to actual situations.

Take FIG. 1 as an example, there is a central device 100 and two edge devices (an edge device 101 and an edge device 102), the edge device 101 is connected to two sensors including the sensor 1011 and the sensor 1012, and the edge device 102 is connected to two sensors including the sensor 1021 and the sensor 1022.

As describe above, in the exemplary figure, the number of the edge devices N equals to three, and the number of sensors Xi connected to the i-th edge device equals to two (i=1 or 2), i.e., each edge device is connected to two sensors.

Each sensor in the distributed system is connected to an edge device, it may collect raw data (also called as unprocessed data or original data) and pass the raw data to the edge device connected thereto.

The edge device is directly connected to one or more sensors, and receives their data to perform signal processing and machine learning algorithms. The output of the edge device may include the processed result and the raw data from each sensor.

The central device and the edge devices in the distributed system may be configured to jointly perform data fusion and related information processing in autonomous driving through interaction. These edge devices can perceive either process individual raw data from each sensor, or receive the data from the central device to process. The result from each edge device is then integrated by the central device to generate the final output, such as the surrounding information.

In an embodiment, the distributed system may also include a deciding device 103 which is connected to the central device 100 and configured to analyze the surrounding information output by the central device 100 and making decisions.

In an embodiment, the central device, the edge device or the determining device may be implemented as SoCs.

In an embodiment, the edge devices may be connected to the central device through a high-speed data link, and serve as a co-processor of the central device.

It should be noted that the number of the edge devices and the number of the sensors connected to each edge device are not limited herein. All the specific numbers throughout the whole specification are given as examples for the convenience of illustration and should not be construed as limitations to the present disclosure. In practice, the number of the edge device connected to the central device is scalable to the choice of the edge devices, and the number of the sensors connected to each edge device is also scalable to the choice of the sensors at the edge, including camera, LiDAR, radar, ultrasound and others for autonomous driving. Thanks to the capability of function re-configurability, this distributed system thus supports various fusion solutions, including both of the Fusion First method and the Fusion Second method, with high efficiency.

As described above, the central device may be connected to multiple edge devices. Depending on actual needs, the central device may interact with all the edge devices or just part of the edge devices, which is not limited herein. Here the edge devices interacting with the central device are referred to as first edge devices. The number of the first edge devices M may be equal to or less than the number of the edge devices N, with M being an integer equal to or greater than 1. Besides, in different application scenarios, the number of the first edge devices M may be different, and the edge devices interacting with the central device may also be different. As shown in FIG. 1, for example, in one application scenario, the central device may interact with the edge device 101 and the edge device 102, in this case, the edge device 101 and the edge device 102 act as the first edge devices, and the number of the first edge devices M equals to two. In another application scenario, the central device may interact only with The edge device 101, so in this case, only one edge device in the distributed system acts as the first edge device, and the number of the first edge devices M equals to one.

Similarly, for a specific first edge device, although it may be connected to multiple sensors, the first edge device may interact with all the sensors or just part of the sensors connected thereto, which is not limited herein. Here the sensors interacting with a first edge device are referred to as first sensors. For the i-th first edge device, the number of the first sensors Yi may be equal to or less than the number of the sensors Xi connected to the i-th first edge device, with Yi being an integer equal to or greater than 1, and i=1, . . . M, where M is the number of the first edge devices. Besides, in different application scenarios, the number of the first sensors Yi may be different, and the first sensors interacting with the central device may also be different. As shown in FIG. 1, continue with the above example, in one application scenario, the central device may interact with the edge device 101 and the edge device 102, in this case, the edge device 101 and the edge device 102 act as the first edge devices, and the number of the first edge devices M equals to two, the edge device 101, as a first edge device, may interact with the sensor 1011 connected thereto, while the edge device 102, as another first edge device, may interact with the sensor 1021 and the sensor 1022 connected thereto, so the number of the first sensors $Y_i$ corresponding to the edge device 101 equals to one, and the number of the first sensors Y2 corresponding to the edge device 102 equals to two. In another application scenario, the central device may interact only with the edge device 101, so in this case, only one edge device in the distributed system acts as the first edge device, and the number of the first edge devices M equals to one, the first edge device in this case may interact with all sensors connected thereto, so the number of the first sensors $Y_i$ corresponding to the edge device 101 equals to two.

In combination with the definition of the first edge device and the first sensor, the scalable data fusion method will be described in detail in the following.

Figure 2:
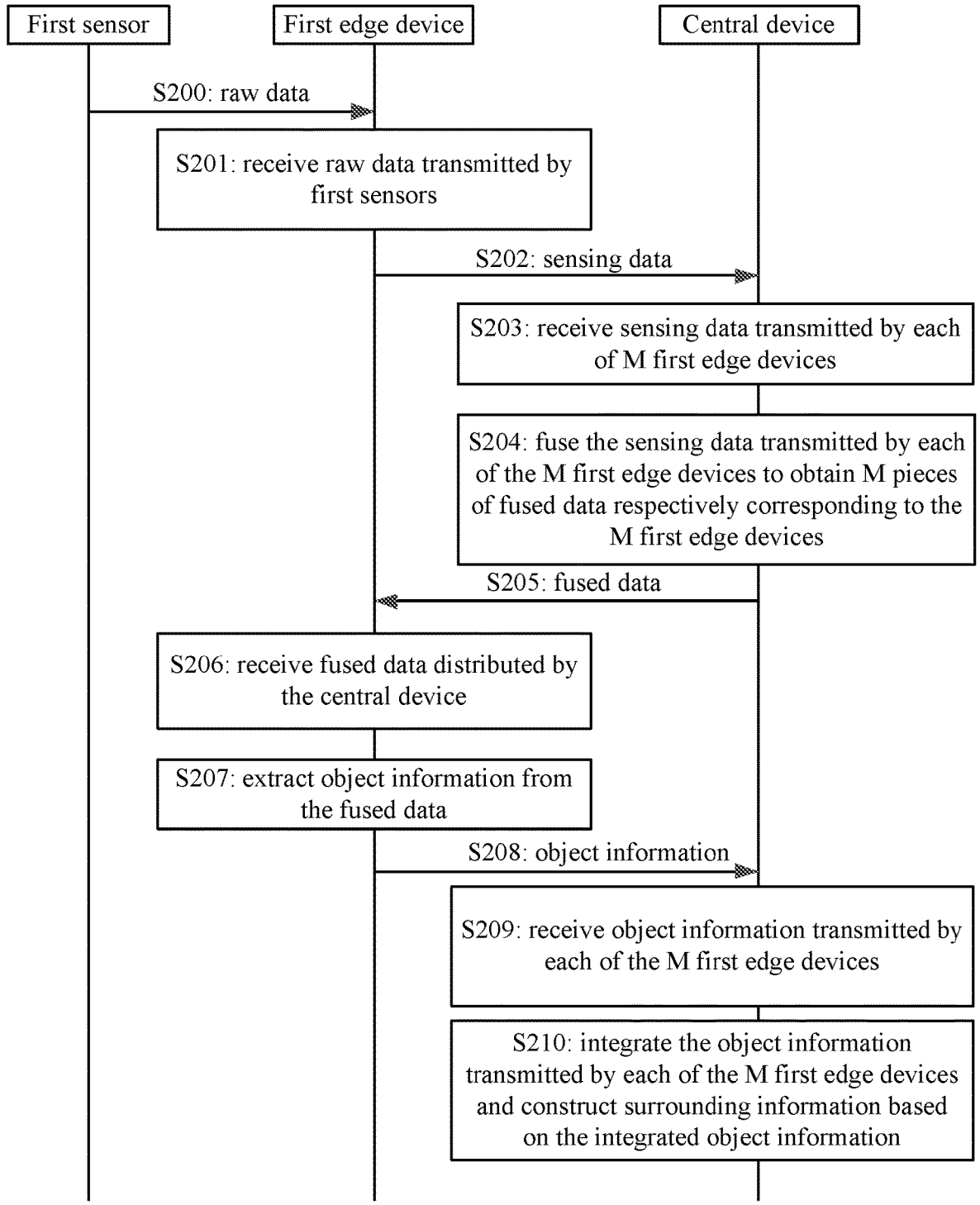
FIG. 2 is a schematic flowchart of a scalable data fusion method according to an embodiment of the present disclosure.
Figure 3:
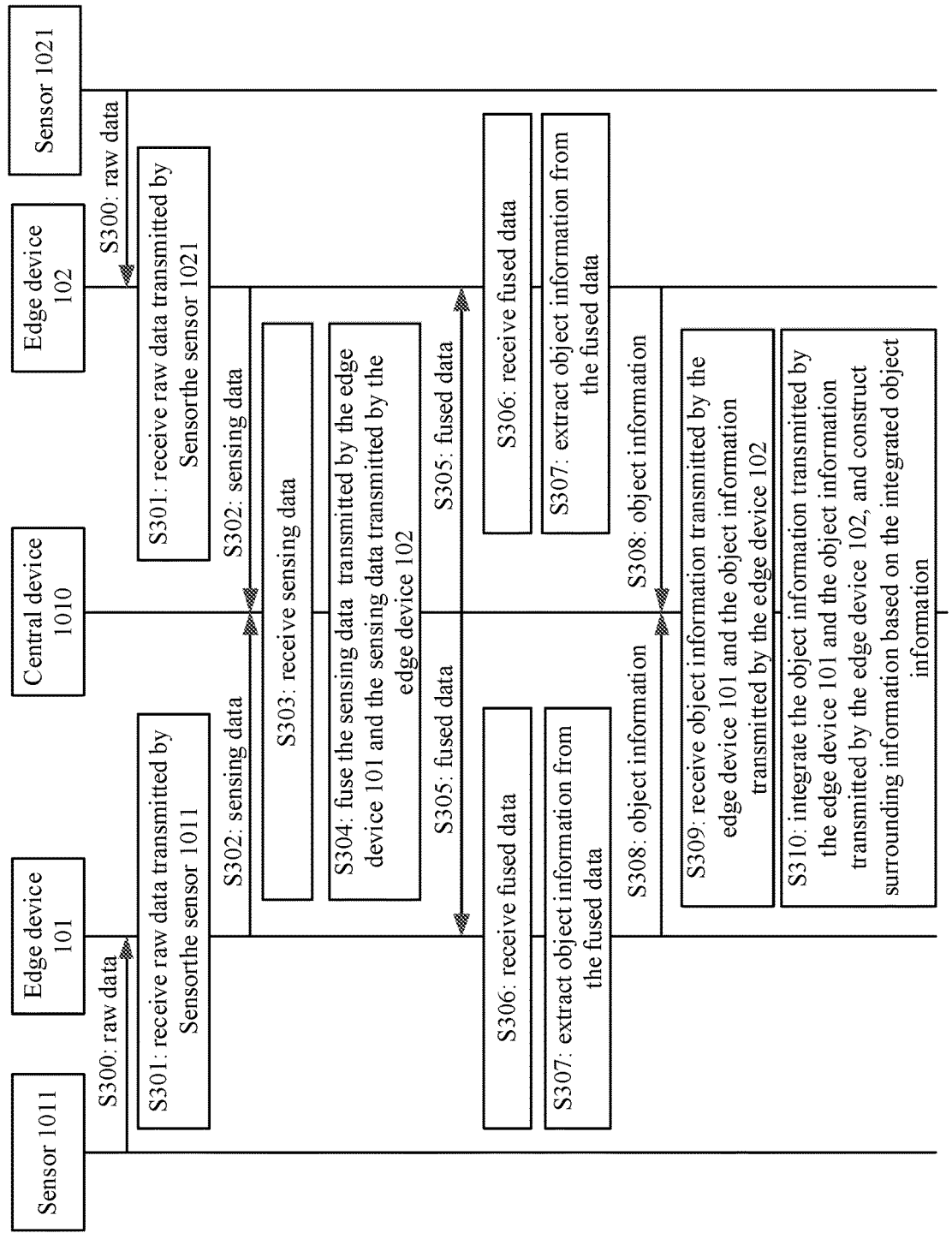
FIG. 3 is a schematic flowchart of a scalable data fusion method according to an embodiment of the present disclosure.

FIG. 2 is a schematic flowchart of a scalable data fusion method according to an embodiment of the present disclosure. It should be noted that although several steps may be described with multiple first edge devices and multiple first sensors, the method or steps also apply in those cases where there is only one the first edge device or only one first sensor connected to a specific first edge device.

The method includes the following steps:

S200: each first sensor transmits raw data to a corresponding first edge device.

Suppose that M is the number of the first edge devices, Yi is the number of the first sensors connected to the i-th first edge device, where i=1, . . . M, with M being an integer equal to or greater than 1. This step is performed by all the first sensors in the distributed system. For a specific sensor, the corresponding first edge device refers to the first edge device connected thereto.

Each first sensor sense and transmit the raw data to the first edge device connected thereto.

S201: each first edge device receives raw data transmitted by first sensors.

This step is performed by all the first edge devices in the distributed system. Then, each first edge device may receive raw data transmitted by the first sensors connected thereto. For the i-th first edge device being connected to Yi first sensors, the i-th first edge device receives raw data from Yi first sensors.

After receiving the raw data from the first sensors, the first edge device may obtain sensing data based on the raw data.

In an embodiment, the i-th first edge device may directly use the raw data from the Yi first sensors as the sensing data. This may be the most accurate approach, but with the highest cost of bandwidth.

In an embodiment, the i-th first edge device may further extract a predefined number of features from the raw data transmitted by the Yi first sensors and use the predefined number of features as the sensing data. Here the predefined number may be determined based on actual needs and specific algorithms. It should be noted that, depending on specific algorithms, the predefined number of features here may also include the raw data from the first sensors. This approach may require high bandwidth in data/information transfer, with better accuracy than Fusion Second method described above.

S202: each first edge device transmits the sensing data to a central device.

After obtaining the sensing data, each first edge device may transmit its own sensing data to the central device connected thereto.

S203: the central device receives sensing data transmitted by each of M first edge devices.

The central device collects the sensing data from the M first edge devices, so it may receive M pieces of sensing data from the M first edge devices. It should be noted that here the sensing data transmitted from one first edge device is regarded as one piece of sensing data, which may include an unfixed amount of data depending on specific amounts and the processing capability of the central device.

S204: the central device fuses the sensing data transmitted by each of the M first edge devices to obtain M pieces of fused data respectively corresponding to the M first edge devices.

After receiving the sensing data from the first edge devices, the central device may fuse the received sensing data.

On considering the cost and the accuracy, the fusion of the sensing data is jointly performed by the central device and the first edge devices. Therefore, instead of completing the fusion at the central device, the central device may integrate the received sensing data and obtain M pieces of fused data respectively corresponding to the M first edge devices.

In an embodiment, the central device fuses the sensing data transmitted by each of the M first edge devices to obtain whole fused data, and then partitions the whole fused data into the M pieces of fused data according to a predefined rule. Here the predefined rule may be determined based on actual algorithms.

S205: the central device distributes the M pieces of fused data to the M first edge devices respectively.

After obtaining the M pieces of fused data, with each piece of fused data corresponding to one first edge device, the central device further distributes the M pieces of fused data to the M first edge devices respectively, so that the M first edge devices may process the fused data.

S206: each first edge device receives fused data distributed by the central device.

This step is performed by all the first edge devices in the distributed system. Each first edge device may receive its corresponding fused data distributed by the central device.

S207: each first edge device extracts object information from the fused data.

In this step, each first edge device extracts its own object information from the corresponding fused data. The extraction method may be as same as those in prior art.

S208: each first edge device transmits its object information to the central device.

After obtaining the object information, each first edge device transmits its own object information to the central device for further processing.

S209: the central device receives object information transmitted by each of the M first edge devices.

The central device receives M pieces of object information from the M first edge devices and then may use the received object information for further construction.

S210: the central device integrates the object information transmitted by each of the M first edge devices and constructs surrounding information based on the integrated object information.

Upon receiving the object information transmitted by each of the M first edge devices, the central device may integrate the object information and construct surrounding information based on the integrated object information. The construction method may be as same as those in prior art.

In order to describe the interaction among the central device, the first edge devices and the first sensors more clearly, reference may be made to FIG. 1. Take the case where the central device interacts with two edge devices and each edge device interacts with one sensor as an example. Correspondingly, the first edge device in the example may be the edge device 101 and the edge device 102, and the first sensor corresponding to the edge device 101 is the sensor 1011, the first sensor corresponding to the edge device 102 is the sensor 1021.

Step 300: the sensor 1011 transmits raw data to the edge device 101 and the sensor 1021 transmits raw data to the edge device 102.

Step 301: the edge device 101 receives raw data transmitted by the sensor 1011 and the edge device 102 receives raw data transmitted by the sensor 1021.

S302: the edge device 101 transmits sensing data to a central device 100 and the edge device 102 transmits sensing data to the central device 100.

S303: the central device 100 receives the sensing data transmitted by the edge device 101 and the sensing data transmitted by the edge device 102.

S304: the central device 100 fuses the sensing data transmitted by the edge device 101 and the sensing data transmitted by the edge device 102 to obtain two pieces of fused data respectively corresponding to the edge device 101 and the edge device 102.

S305: the central device 100 distributes the two pieces of fused data to the edge device 101 and the edge device 102 respectively.

S306: the edge device 101 receives fused data distributed by the central device 100 and the edge device 102 receives fused data distributed by the central device 100.

S307: The edge device 101 extracts object information from the fused data and the edge device 102 extracts object information from the fused data.

S308: the edge device 101 transmits object information to the central device 100 and the edge device 102 transmits object information to the central device.

S309: the central device 100 receives the object information transmitted by the edge device 101 and the object information transmitted by the edge device 102.

S310: the central device 100 integrates the object information transmitted by the edge device 101 and the object information transmitted by the edge device 102, and constructs surrounding information based on the integrated object information.

It should be noted that in all the above steps, when the two sensors or two first edge devices perform similar operations, such as in step 300, both sensors transmit raw data to the first edge devices, or in step 302, both first edge devices transmit sensing data to the central device, these operations in the same step may be performed at the same time, or in sequence, which is not limited herein.

The method described above may provide many advantages in performing the data fusion, for example, data fusion is jointly managed by both the central device and the first edge devices, instead of the central device alone (as done in prior art), thereby reducing the complexity and cost/power associated with the central device. Besides, depending on the user scenario, the first edge devices can either pass the raw data from the first sensors or partially extract object features, and then pass them to the central device to perform Fusion First method. The first edge device itself can also independently perform some local, limited fusion tasks, and act as a co-processor to the central device, hence improving the flexibility of the distributed system. Further, in prior art, if more sensors are added, a more powerful fusion system on chip (SoC) is needed to handle the increasing amount of data. According to the present disclosure, this may be managed by increasing the number of the first edge devices, instead of building a more powerful central device. Moreover, with multiple first edge devices and the central device together, the system itself monitors the reliability of each SoC (each device). If a first edge device has a functional failure, the workload will be re-distributed among other first edge devices to guarantee system availability, thus increasing the system reliability.

Figure 4:
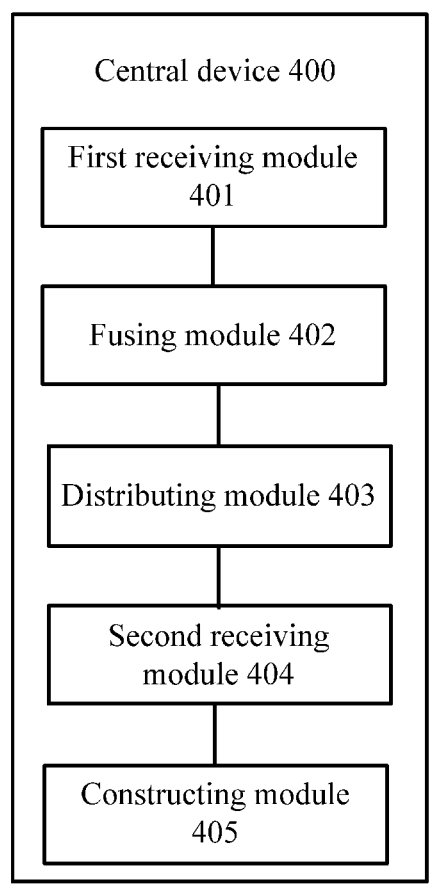
FIG. 4 is a structural view of a central device according to an embodiment of the present disclosure.

FIG. 4 is a structural view of a central device according to an embodiment of the present disclosure. The central device 400 includes a first receiving module 401, a fusing module 402, a distributing module 403, a second receiving module 404 and a constructing module 405.

The first receiving module 401 is configured to receive sensing data transmitted by each of M first edge devices, where M is an integer equal to or greater than 1; the fusing module 402 is configured to fuse the sensing data transmitted by each of the M first edge devices to obtain M pieces of fused data respectively corresponding to the M first edge devices; the distributing module 403 is configured to distribute the M pieces of fused data to the M first edge devices respectively; the second receiving module 404 is configured to receive object information transmitted by each of the M first edge devices, where the object information is obtained based on the fused data; and the constructing module 405 is configured to integrate the object information transmitted by each of the M first edge devices and construct surrounding information based on the integrated object information.

In an embodiment, the fusing module 402 is configured to fuse the sensing data transmitted by each of the M first edge devices to obtain whole fused data; and partition the whole fused data into the M pieces of fused data according to a predefined rule.

In an embodiment, the sensing data transmitted by the i-th first edge device includes raw data received by the i-th first edge device from Yi first sensors, where Yi is an integer equal to or greater than 1, and i=1, . . . M.

In an embodiment, the sensing data transmitted by the i-th first edge device includes a predefined number of features extracted by the i-th first edge device from raw data of Yi first sensors, where Yi is an integer equal to or greater than 1, and i=1, . . . M.

It should be understood that the central device 400 may correspond to the central device in the method embodiments, and can implement corresponding operations implemented by the central device in the method embodiments, which will not be repeated for the sake of brevity.

Figure 5:
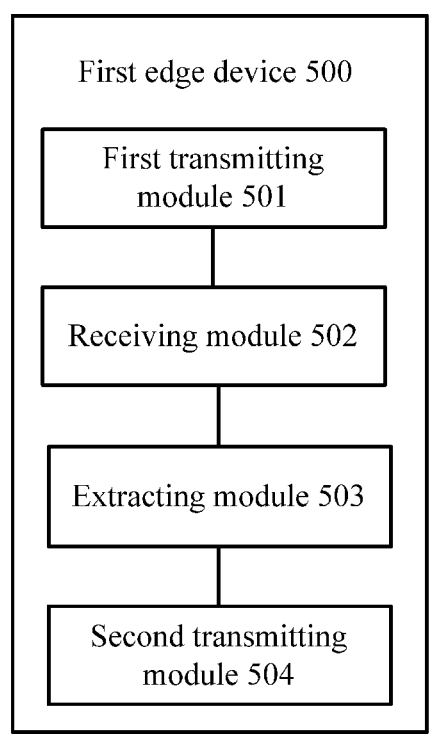
FIG. 5 is a structural view of a first edge device according to an embodiment of the present disclosure.

FIG. 5 is a structural view of a first edge device according to an embodiment of the present disclosure. The first edge device 500 includes a first transmitting module 501, a receiving module 502, an extracting module 503 and a second transmitting module 504.

The first transmitting module 501 is configured to transmit sensing data to a central device; the receiving module 502 is configured to receive fused data distributed by the central device, where the fused data is obtained by the central device through fusion of the sensing data transmitted by each of M first edge devices, where M is an integer equal to or greater than 1; the extracting module 503 is configured to extract object information from the fused data; and the second transmitting module 504 is configured to transmit the object information to the central device.

In an embodiment, the first receiving module 502 is configured to receive raw data transmitted by Y first sensors as the sensing data, where Y is an integer equal to or greater than 1.

In an embodiment, the first receiving module 502 is configured to receive raw data transmitted by Y first sensors, where Y is an integer equal to or greater than 1; and extract a predefined number of features from the raw data transmitted by the Y first sensors as the sensing data.

It should be understood that the first edge device 500 may correspond to the first edge device in the method embodiments, and can implement corresponding operations implemented by the first edge device in the method embodiments, which will not be repeated for the sake of brevity.

Figure 6:
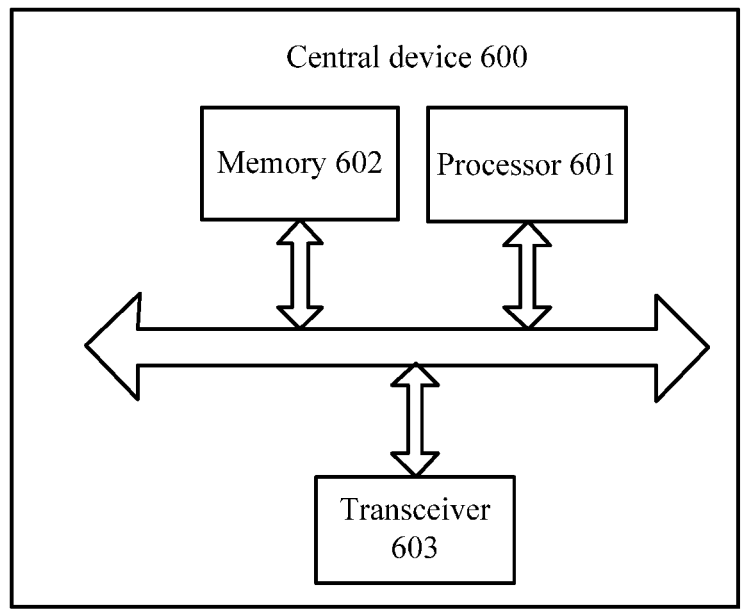
FIG. 6 is a structural view of a central device according to an embodiment of the present disclosure.

FIG. 6 is a structural view of a central device according to an embodiment of the present disclosure. The central device 600 includes a processor 601 and a memory 602. The memory 601 can store a computer program, and the processor 602 can execute the computer program stored in the memory 602.

In an embodiment, as shown in FIG. 6, the central device 600 may include a transceiver 603, the processor 601 can control the transceiver 603 to perform external communications.

In an embodiment, the processor 601 can call the computer program stored in the memory 602 to perform corresponding operations of the central device in the method embodiments, which will not be repeated for the sake of brevity.

Figure 7:
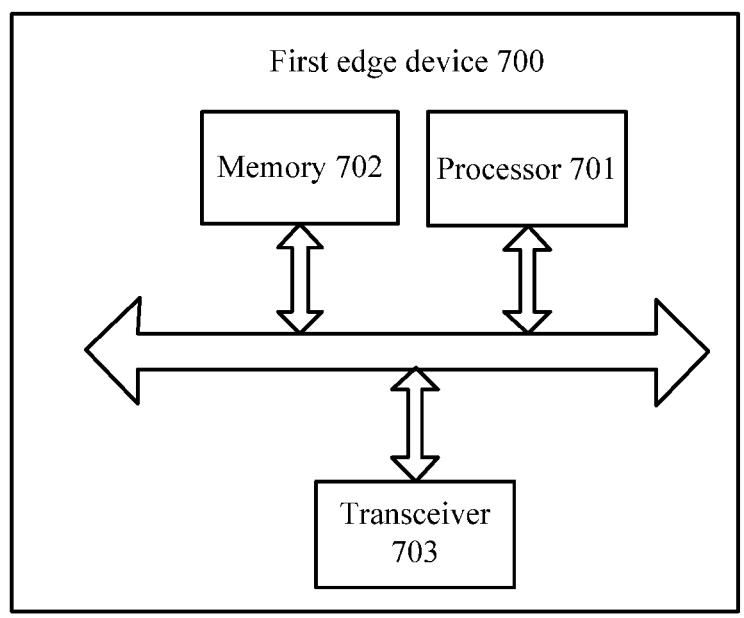
FIG. 7 is a structural view of a first edge device according to an embodiment of the present disclosure.

FIG. 7 is a structural view of a first edge device according to an embodiment of the present disclosure. The central device 700 includes a processor 701 and a memory 702. The memory 701 can store a computer program, and the processor 702 can execute the computer program stored in the memory 702.

In an embodiment, as shown in FIG. 7, the first edge device 700 may include a transceiver 703, the processor 701 can control the transceiver 703 to perform external communications.

In an embodiment, the processor 701 can call the computer program stored in the memory 702 to perform corresponding operations of the first edge device in the method embodiments, which will not be repeated for the sake of brevity.

Figure 8:
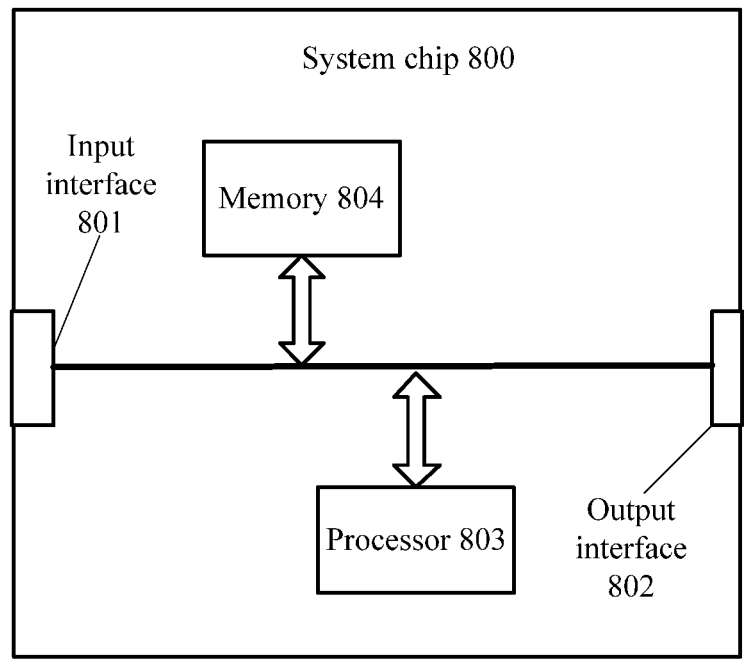
FIG. 8 is a structural view of a system chip according to an embodiment of the present disclosure.

FIG. 8 is a structural view of a system chip according to an embodiment of the present disclosure. The system chip 800 of FIG. 8 includes an input interface 801, an output interface 802, a processor 803 and a memory 804 that can be connected by internal communication connection lines, and the processor 803 is configured to execute a computer program in the memory 804.

In an embodiment, when the computer program is executed, the processor 803 implements the method performed by the central device in the method embodiments, which will not be repeated for the sake of brevity.

Figure 9:
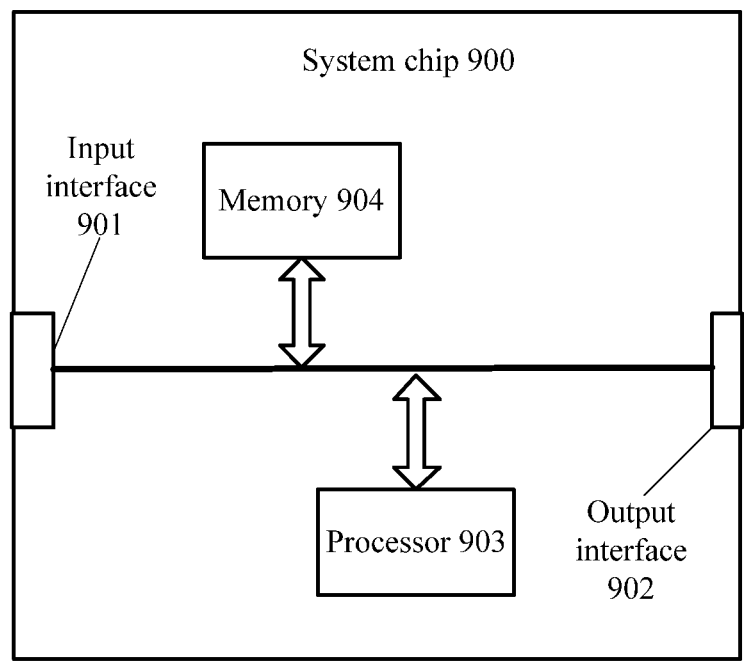
FIG. 9 is a structural view of a system chip according to an embodiment of the present disclosure.

FIG. 9 is a structural view of a system chip according to an embodiment of the present disclosure. The system chip 900 of FIG. 9 includes an input interface 901, an output interface 902, a processor 903 and a memory 904 that can be connected by internal communication connection lines, and the processor 903 is configured to execute a computer program in the memory 904.

In an embodiment, when the computer program is executed, the processor 903 implements the method performed by the first edge device in the method embodiments, which will not be repeated for the sake of brevity.

The present disclosure further provides a computer readable storage medium storing a computer program, where the program is executed by a processor to implement the scalable data fusion method performed by the central device in the method embodiments.

The present disclosure further provides a computer readable storage medium storing a computer program, where the program is executed by a processor to implement the scalable data fusion method performed by the first edge device in the method embodiments.

The present disclosure further provides a distributed system including a central device and at least one first edge device, the central device being connected to N edge devices and interacted with M first edge devices in the N edge devices, where N and M are integers equal to or greater than 1, and N is equal to or greater than M, where the central device is configured to perform corresponding operations of the central device in the method embodiments, and the first edge device is configured to perform corresponding operations of the first edge device in the method embodiments, which will not be repeated for the sake of brevity.

Terms such as "first", "second" and the like in the specification and claims of the present disclosure as well as in the above drawings are intended to distinguish different objects, but not intended to define a particular order.

The term such as "and/or" in the embodiments of the present disclosure is merely used to describe an association between associated objects, which indicates that there may be three relationships, for example, A and/or B may indicate presence of A only, of both A and B, and of B only.

The term "a" or "an" is not intended to specify one or a single element, instead, it may be used to represent a plurality of elements where appropriate.

It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

In the embodiments of the present disclosure, expressions such as "exemplary" or "for example" are used to indicate illustration of an example or an instance. In the embodiments of the present disclosure, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise a random access memory (RAM), a read-only memory (ROM), an electrically erasable programmable ROM (EEPROM), a compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them.

While the present invention is described herein with reference to illustrative embodiments, this description is not intended to be construed in a limiting sense. Rather, the purpose of the illustrative embodiments is to make the spirit of the present invention better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A scalable data fusion method applied in a central device and comprising:
    receiving sensing data transmitted by each of M first edge devices, wherein M is an integer equal to or greater than 1;
    fusing the sensing data transmitted by each of the M first edge devices to obtain M pieces of fused data respectively corresponding to the M first edge devices;
    distributing the M pieces of fused data to the M first edge devices respectively;
    receiving object information transmitted by each of the M first edge devices, wherein the object information is obtained based on the fused data; and
    integrating the object information transmitted by each of the M first edge devices and constructing surrounding information based on the integrated object information.

2. The scalable data fusion method according to claim 1, wherein the fusing the sensing data transmitted by each of the M first edge devices to obtain M pieces of fused data respectively corresponding to the M first edge devices comprises:
    fusing the sensing data transmitted by each of the M first edge devices to obtain whole fused data; and
    partitioning the whole fused data into the M pieces of fused data according to a predefined rule.

3. The scalable data fusion method according to claim 1, wherein the sensing data transmitted by the i-th first edge device comprises raw data received by the i-th first edge device from $Y_i$ first sensors, wherein $Y_i$ is an integer equal to or greater than 1, and i=1, ... M.

4. The scalable data fusion method according to claim 1, wherein the sensing data transmitted by the i-th first edge device comprises a predefined number of features extracted by the i-th first edge device from raw data of $Y_i$ first sensors, wherein $Y_i$ is an integer equal to or greater than 1, and i=1, ... M.

5. A central device comprising a processor, a transceiver and a memory, wherein
    the transmitter is configured to receive sensing data transmitted by each of the M first edge devices, wherein M is an integer equal to or greater than 1;
    the memory stores a computer program which when being executed by the processor causes the processor to: fuse the sensing data transmitted by each of the M first edge devices to obtain M pieces of fused data respectively corresponding to the M first edge devices;
    wherein the transceiver is further configured to distribute the M pieces of fused data to the M first edge devices respectively;
    wherein the processor is further configured to receive object information transmitted by each of the M first edge devices, wherein the object information is obtained based on the fused data; and
    wherein the transceiver is further configured to integrate the object information transmitted by each of the M first edge devices and construct surrounding information based on the integrated object information.

6. The central device according to claim 5, wherein the processor is configured to:
    fuse the sensing data transmitted by each of the M first edge devices to obtain whole fused data; and
    partition the whole fused data into the M pieces of fused data according to a predefined rule.

7. The central device according to claim 5, wherein the sensing data transmitted by the i-th first edge device comprises raw data received by the i-th first edge device from $Y_i$ first sensors, wherein $Y_i$ is an integer equal to or greater than 1, and i=1, ... M.

8. The central device according to claim 5, wherein the sensing data transmitted by the i-th first edge device comprises a predefined number of features extracted by the i-th first edge device from raw data of $Y_i$ first sensors, wherein $Y_i$ is an integer equal to or greater than 1, and i=1, ... M.

9. A first edge device comprising a processor, a transceiver and a memory, wherein
    the transceiver is configured to transmit sensing data to a central device; and receive fused data distributed by the central device, wherein the fused data is obtained by the central device through fusion of the sensing data transmitted by each of M first edge devices, wherein M is an integer equal to or greater than 1;
    the memory stores a computer program which when being executed by the processor causes the processor to extract object information from the fused data; and
    wherein the transceiver is further configured to transmit the object information to the central device.

10. The first edge device according to claim 9, wherein the transceiver is configured to:

receive raw data transmitted by Y first sensors as the sensing data, wherein Y is an integer equal to or greater than 1.

11. The first edge device according to claim 9, wherein the transceiver is configured to:
receive raw data transmitted by Y first sensors, wherein Y is an integer equal to or greater than 1; and
wherein the processor is configured to:
extract a predefined number of features from the raw data transmitted by the Y first sensors as the sensing data.

* * * * *